US011824598B2

(12) United States Patent
Koeppel et al.

(10) Patent No.: US 11,824,598 B2
(45) Date of Patent: Nov. 21, 2023

(54) NEAR FIELD COMMUNICATION DEVICE CAPABLE OF OPERATING IN A POWERED OR UNPOWERED MODE

(71) Applicant: Capital One Services, LLC, McLean, VA (US)

(72) Inventors: Adam Koeppel, Washington, DC (US); Tyler Locke, Washington, DC (US); Kevin Kelly, Austin, TX (US); Robert Perry, Ashburn, VA (US); James Zarakas, Centreville, VA (US)

(73) Assignee: Capital One Services, LLC, McLean, VA (US)

( * ) Notice: Subject to any disclaimer, the term of this patent is extended or adjusted under 35 U.S.C. 154(b) by 235 days.

(21) Appl. No.: 17/247,619

(22) Filed: Dec. 18, 2020

(65) Prior Publication Data

US 2021/0111760 A1   Apr. 15, 2021

Related U.S. Application Data

(63) Continuation of application No. 16/280,631, filed on Feb. 20, 2019, now Pat. No. 10,873,367, which is a (Continued)

(51) Int. Cl.
*H04B 5/00* (2006.01)
*H04W 4/80* (2018.01)
*H04W 52/02* (2009.01)

(52) U.S. Cl.
CPC ......... *H04B 5/0031* (2013.01); *H04B 5/0037* (2013.01); *H04W 4/80* (2018.02); *H04W 52/0261* (2013.01); *H04B 5/0056* (2013.01)

(58) Field of Classification Search
CPC .. H04B 5/0031; H04B 5/0037; H04B 5/0056; H04W 4/80; H04W 52/0261; Y02D 30/70
See application file for complete search history.

(56) References Cited

U.S. PATENT DOCUMENTS

| D651,237 S | 12/2011 | Mullen et al. |
| D651,238 S | 12/2011 | Mullen et al. |

(Continued)

FOREIGN PATENT DOCUMENTS

EP   2600639 A1   6/2013

OTHER PUBLICATIONS

Extended European Search Report for Application No. EP18208566.2, dated Mar. 27, 2019, 9 pages.

*Primary Examiner* — Jianxun Yang
(74) *Attorney, Agent, or Firm* — Harrity & Harrity, LLP

(57) ABSTRACT

In some implementations, a near field communication (NFC) device may determine whether the NFC device is to perform a wireless transaction in a powered mode or an unpowered mode, and may selectively perform the wireless transaction in the powered mode or the unpowered mode based on determining whether the NFC device is to perform the wireless transaction in the powered mode or the unpowered mode. The wireless transaction may be performed using power from a power source internal to the NFC device when the wireless transaction is performed in the powered mode. The wireless transaction may be performed without using power from the power source internal to the NFC device when the wireless transaction is performed in the unpowered mode.

20 Claims, 5 Drawing Sheets

Related U.S. Application Data continuation of application No. 15/823,154, filed on Nov. 27, 2017, now Pat. No. 10,218,412.

(56) References Cited

U.S. PATENT DOCUMENTS

| | | |
|---|---|---|
| D651,644 S | 1/2012 | Mullen et al. |
| D652,075 S | 1/2012 | Mullen et al. |
| D652,076 S | 1/2012 | Mullen et al. |
| D652,448 S | 1/2012 | Mullen et al. |
| D652,449 S | 1/2012 | Mullen et al. |
| D652,450 S | 1/2012 | Mullen et al. |
| D652,867 S | 1/2012 | Mullen et al. |
| D653,288 S | 1/2012 | Mullen et al. |
| D665,022 S | 8/2012 | Mullen et al. |
| D665,447 S | 8/2012 | Mullen et al. |
| D666,241 S | 8/2012 | Mullen et al. |
| D670,329 S | 11/2012 | Mullen et al. |
| D670,330 S | 11/2012 | Mullen et al. |
| D670,331 S | 11/2012 | Mullen et al. |
| D670,332 S | 11/2012 | Mullen et al. |
| D670,759 S | 11/2012 | Mullen et al. |
| D672,389 S | 12/2012 | Mullen et al. |
| D673,606 S | 1/2013 | Mullen et al. |
| D674,013 S | 1/2013 | Mullen et al. |
| D675,256 S | 1/2013 | Mullen et al. |
| D676,487 S | 2/2013 | Mullen et al. |
| D676,904 S | 2/2013 | Mullen et al. |
| D687,094 S | 7/2013 | Mullen et al. |
| D687,095 S | 7/2013 | Mullen et al. |
| D687,487 S | 8/2013 | Mullen et al. |
| D687,488 S | 8/2013 | Mullen et al. |
| D687,489 S | 8/2013 | Mullen et al. |
| D687,490 S | 8/2013 | Mullen et al. |
| D687,887 S | 8/2013 | Mullen et al. |
| D688,744 S | 8/2013 | Mullen et al. |
| D692,053 S | 10/2013 | Mullen et al. |
| 10,218,412 B1 | 2/2019 | Koeppel et al. |
| 10,873,367 B2 | 12/2020 | Koeppel et al. |
| 2007/0279225 A1 | 12/2007 | Pellerano et al. |
| 2013/0084803 A1* | 4/2013 | Hall .................. H04W 52/0277 455/41.1 |
| 2013/0144793 A1* | 6/2013 | Royston ............... G06Q 20/326 705/72 |
| 2013/0295843 A1 | 11/2013 | Tian et al. |
| 2015/0044964 A1 | 2/2015 | Khan et al. |
| 2015/0333397 A1* | 11/2015 | Buchsbaum ............. H01Q 7/08 343/788 |
| 2017/0039566 A1 | 2/2017 | Schipperheijn |

\* cited by examiner

NEAR FIELD COMMUNICATION DEVICE CAPABLE OF OPERATING IN A POWERED OR UNPOWERED MODE

RELATED APPLICATIONS

This application is a continuation of U.S. patent application Ser. No. 16/280,631, filed Feb. 20, 2019 (now U.S. Pat. No. 10,873,367), which is a continuation of U.S. patent application Ser. No. 15/823,154, filed Nov. 27, 2017 (now U.S. Pat. No. 10,218,412), which are incorporated herein by reference.

BACKGROUND

Near field communication (NFC) may refer to a set of communication protocols that enable two devices to establish communication by bringing the devices within close proximity (e.g., 4 cm) of one another. NFC devices may be used in contactless payment systems, in social networking, for sharing contacts, photos, videos, files, and/or the like.

SUMMARY

According to some possible implementations, a near field communication (NFC) device may include an internal power source, a secure element, an NFC antenna, and one or more components at least partially implemented in hardware. The one or more components may be configured to determine whether the NFC device is to perform a contactless transaction in a powered mode or an unpowered mode, and may be configured to selectively perform the contactless transaction in the powered mode or the unpowered mode based on determining whether the NFC device is to perform the contactless transaction in the powered mode or the unpowered mode. The contactless transaction may be performed using power from the internal power source when the contactless transaction is performed in the powered mode. The contactless transaction may be performed using only power from an external NFC field when the contactless transaction is performed in the unpowered mode.

According to some possible implementations, a method may include determining, by a near field communication (NFC) device, whether the NFC device is to perform a wireless transaction in a powered mode or an unpowered mode. The method may include selectively performing, by the NFC device, the wireless transaction in the powered mode or the unpowered mode based on determining whether the NFC device is to perform the wireless transaction in the powered mode or the unpowered mode. The wireless transaction may be performed using power from a power source internal to the NFC device when the wireless transaction is performed in the powered mode. The wireless transaction may be performed without using power from the power source internal to the NFC device when the wireless transaction is performed in the unpowered mode.

According to some possible implementations, an apparatus may include an internal power source, a controller configured to receive power from the internal power source, and an integrated circuit that includes an antenna and a secure element capable of selectively performing a near field communication (NFC) data transmission in a powered mode or an unpowered mode. The NFC data transmission may be performed using power from the internal power source and using information received from the controller when the NFC data transmission is performed in the powered mode. The NFC data transmission may be performed without using power from the internal power source and without using information from the controller when the NFC data transmission is performed in the unpowered mode.

DETAILED DESCRIPTION

The following detailed description of example implementations refers to the accompanying drawings. The same reference numbers in different drawings may identify the same or similar elements.

An NFC device may include a secure element capable of securely hosting an application and/or an operating system, storing confidential data associated with the application and/or operating system, and/or storing cryptographic data (e.g., a cryptographic key and/or the like) associated with the application and/or operating system. For example, a secure element may host an application for performing a transaction, and may store credentials and/or cryptographic keys for authenticating the transaction. A secure element may assist with performing different types of transactions, such as financial transactions (e.g., contactless transactions) using different payment methods, user identification, access, transit, ticketing, and/or the like. To perform different types of transactions, the NFC device may load different applications onto the secure element, and may execute a particular application to perform a particular type of transaction.

If the NFC device does not include an internal power source (e.g., a battery and/or the like), then the NFC device may use power obtained from an NFC field to load an application onto a secure element and/or unload an application from the secure element. However, using power obtained from an NFC field may be cumbersome and slow, and may require the NFC device to be placed and held within the NFC field while one or more applications are transferred to/from the secure element and/or configured to perform a transaction. If the NFC device includes an internal power source, then the NFC device may use power obtained from the internal power source to load an application onto the secure element, unload an application from the secure element, configure an application for performing a transaction, and/or the like. This is faster and less cumbersome than using power from an NFC field, but requires that the internal power source have sufficient power to perform these operations.

Some implementations described herein permit an NFC device to switch between using power from an internal power source and power from an NFC field to assist with performing a transaction. In this way, one or more applications can be quickly loaded, unloaded, and/or configured when the internal power source has sufficient power, and the NFC device can fall back to using power from an NFC field to load, unload, and/or configure an application when the internal power source does not have sufficient power. Additional details are described herein.

Figure 1A:
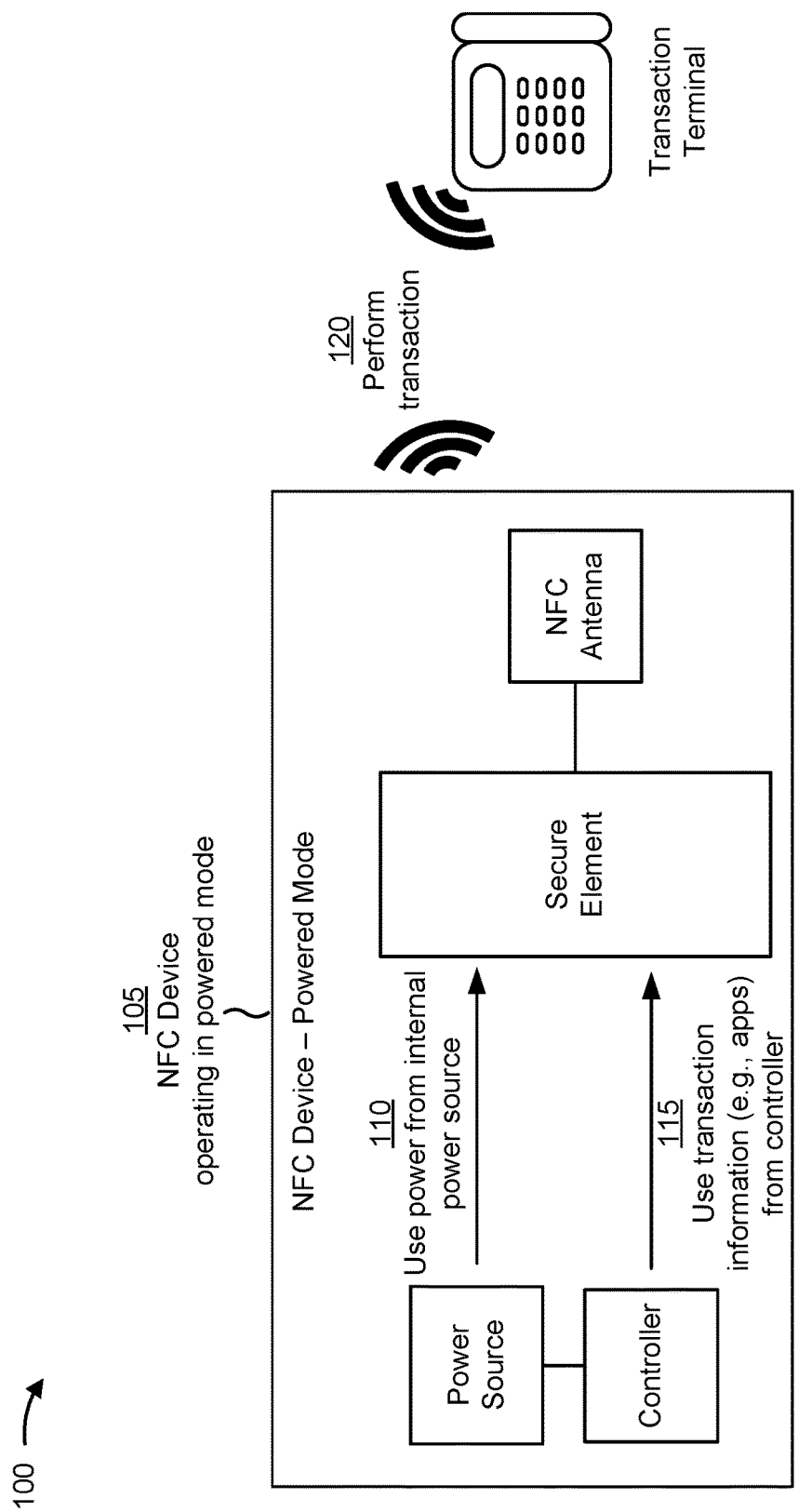
FIGS. 1A and 1B are diagrams of an overview of an example implementation described herein.
Figure 1B:
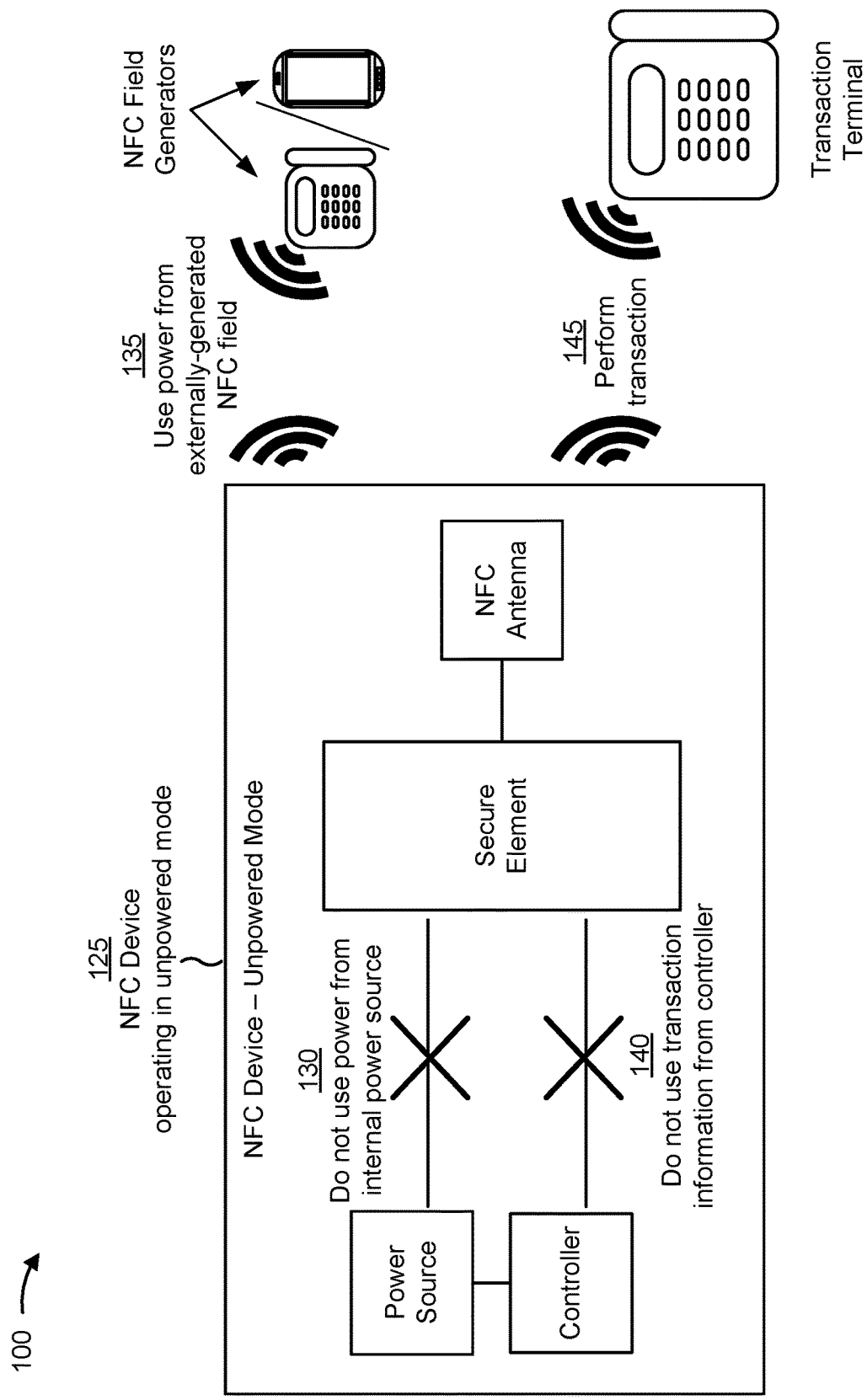

FIGS. 1A and 1B are diagrams of an overview of an example implementation 100 described herein. As shown in FIG. 1A, an NFC device may include a power source internal to the NFC device, a controller, a secure element, and an NFC antenna. As shown by reference number 105, in some implementations, the NFC device may be capable of performing a transaction in a powered mode, such as when a remaining power level of the power source is sufficient to power the transaction to be performed by the NFC device and/or one or more operations associated with the transaction (e.g., monitoring transaction data, communicating between the controller and the secure element, enhancing a speed and/or range of the transaction, and/or the like), when additional processing is to be performed in connection with the transaction (e.g., fraud monitoring, transaction analytics, and/or the like), when a user, merchant, transacting party, or other party associated with the transaction sets a preference for performing transactions in the powered mode, and/or the like. In this case, as shown by reference number 110, the secure element (e.g., a processing component of the secure element) may use power from the power source to assist with performing the transaction. For example, the secure element may use power from the power source to load an application associated with the transaction into memory of the secure element, to unload an application not associated with the transaction from memory of the secure element, to configure an application for performing the transaction, and/or the like.

Additionally, or alternatively, as shown by reference number 115, the secure element may use transaction information, provided by the controller, to perform the transaction in the powered mode. For example, the controller may store one or more applications in memory, and may provide information and/or instructions to the secure element for loading an application, for configuring an application, for executing an application, and/or the like. The application may include an application for performing the transaction (e.g., a financial application, a transit application, a ticketing application, an access application, an identity verification application, and/or the like), an application for improving security of the transaction, and/or the like. Additional details are described elsewhere herein.

As shown by reference number 120, when performing the transaction in the powered mode, the NFC device may perform the transaction using power from the internal power source and/or using information from the controller. For example, the secure element may interact with an external device, such as a transaction terminal, using an NFC antenna (e.g., which may operate using power from an externally generated NFC field, even in the powered mode). The transaction may include any interaction that uses NFC to exchange information between the NFC device and the transaction terminal, such as a data communication, a financial transaction, a transaction to provide access to a secure area, a ticketing transaction, a transit transaction, an identification transaction, and/or the like.

By performing a transaction using power from an internal power source when the internal power source has sufficient power to perform the transaction, the NFC device may increase the speed at which the transaction is performed as compared to using power from an NFC field. Furthermore, the reliability of the transaction may be improved because the NFC device need not be positioned within an NFC field to provide power for the transaction. Furthermore, by using information (e.g., an application) from a controller of the NFC device, other aspects of the transaction may be improved, such as security of the transaction, flexibility of the transaction, and/or the like.

As shown in FIG. 1B, and by reference number 125, in some implementations, the NFC device may be capable of performing a transaction in an unpowered mode, such as when a remaining power level of the internal power source is not sufficient to power the transaction to be performed by the NFC device and/or one or more operations associated with the transaction, when additional processing need not be performed in connection with the transaction (e.g., fraud monitoring, transaction analytics, and/or the like), when a user, merchant, transacting party, or other party associated with the transaction sets a preference for performing transactions in the unpowered mode, and/or the like. In this case, as shown by reference number 130, the secure element (e.g., a processing component of the secure element) may not use power from the internal power source to assist with performing the transaction. Instead, as shown by reference number 135, the secure element may use power from an externally-generated NFC field to assist with performing the transaction. For example, the secure element may use power from an NFC field generated by one or more NFC field generators (e.g., a transaction terminal, a mobile device, a smart phone, and/or the like) to load an application associated with the transaction into memory of the secure element, to unload an application not associated with the transaction from memory of the secure element, to configure an application for performing the transaction, and/or the like.

Additionally, or alternatively, as shown by reference number 140, the secure element may not use transaction information from the controller to perform the transaction in the unpowered mode. In this case, the secure element may store a minimum amount of information, in memory of the secure element, that is required for performing a basic transaction (e.g., one or more credentials, cryptographic keys, and/or the like).

As shown by reference number 145, when performing the transaction in the unpowered mode, the NFC device may perform the transaction using power from the NFC field and/or without using information from the controller. For example, the secure element may interact with an external device, such as a transaction terminal, using an NFC antenna (e.g., which may be powered using the external NFC field). The transaction may include any interaction that uses NFC to exchange information between the NFC device and the transaction terminal, such as a data communication, a financial transaction, a transaction to provide access to a secure area, a ticketing transaction, a transit transaction, an identification transaction, and/or the like.

By performing a transaction using power from an externally-generated NFC field when the internal power source does not have sufficient power to perform the transaction, the NFC device may ensure that the transaction can be performed regardless of the power level of the internal power source. Additionally, or alternatively, the NFC device may perform transactions in a flexible manner (e.g., based on whether to perform additional processing for the transaction, based on a user preference, based on a merchant preference, and/or the like). Furthermore, some implementations described herein may improve operation of the NFC device and conserve resources that would otherwise be wasted by a failed transaction (e.g., where the NFC device begins a transaction with power from the internal power source, but runs out of power before the transaction is completed).

As indicated above, FIGS. 1A and 1B are provided merely as examples. Other examples are possible and may differ from what was described with regard to FIGS. 1A and 1B.

Figure 2:
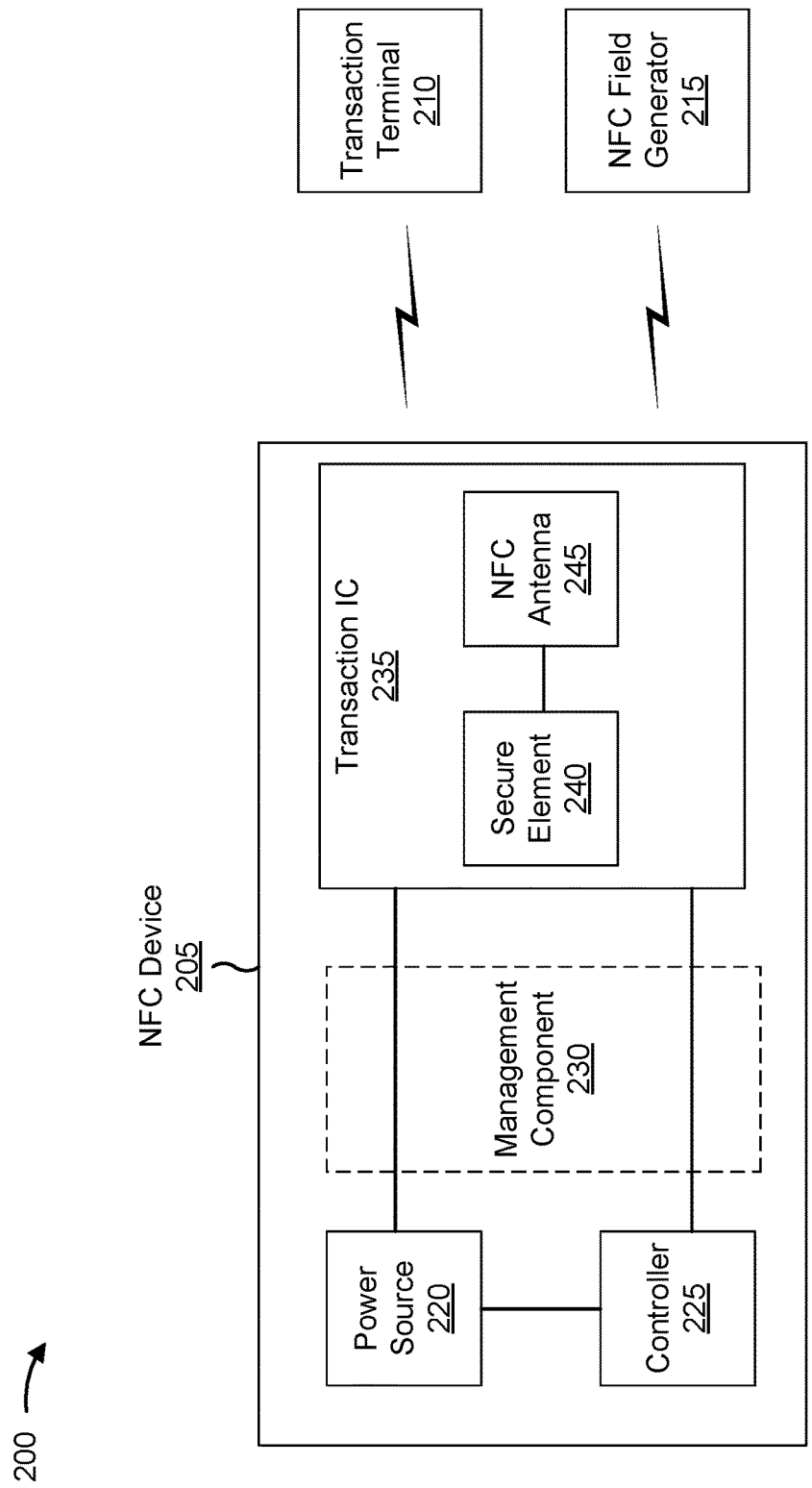
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an NFC device 205, a transaction terminal 210, and an NFC field generator 215. As further shown, NFC device 205 may include a power source 220, a controller 225, a management component 230, and a transaction integrated circuit (IC) 235, which may include a secure element 240 and an NFC antenna 245. Devices of environment 200 may interconnect via wired connections, wireless connections, or a combination of wired and wireless connections.

NFC device 205 includes one or more devices capable of communicating using NFC. For example, NFC device 205 may include a phone (e.g., a mobile phone, a smart phone, a radiotelephone, and/or the like), a tablet computer, a laptop computer, a transaction card (e.g., a smart card, a credit card, a debit card, a transit card, and/or the like), a smart wallet, a wearable device (e.g., a smart watch, smart eyeglasses, smart clothing, and/or the like), an Internet of Things (IoT) device, and/or the like. In some implementations, NFC device 205 may be capable of performing a contactless transaction, such as a financial transaction, an access transaction, a transit transaction, a ticketing transaction, and/or the like.

Transaction terminal 210 includes one or more devices capable of interacting with NFC device 205 to perform a transaction. For example, transaction terminal 210 may include a contactless transaction terminal, an NFC reader, a self-checkout station, a kiosk, a point-of-sale (PoS) terminal, a security access terminal, an automated teller machine (ATM) terminal, a phone (e.g., a mobile phone, a smart phone, a radiotelephone, and/or the like), a desktop computer, a laptop computer, a tablet computer, and/or the like. Transaction terminal 210 may include one or more input devices and/or output devices to facilitate obtaining transaction information from NFC device 205. Example input devices of transaction terminal 210 may include an NFC antenna, a number keypad, a touchscreen, a magnetic strip reader, a chip reader, a camera, a scanner (e.g., a barcode scanner, QR code scanner, and/or the like), and/or a radio frequency (RF) signal reader. Example output devices of transaction terminal 210 may include a display device, a speaker, a printer, and/or the like. NFC device 205 may interact with transaction terminal 210 to perform a transaction.

NFC field generator 215 includes one or more devices, external from NFC device 205, capable of generating an NFC field. For example, NFC field generator 215 may include a phone, a transaction terminal (e.g., transaction terminal 210), a tablet computer, a laptop computer, a transaction card, a smart wallet, a wearable device, an Internet of Things (IoT) device, and/or the like. In some implementations, NFC device 205 may obtain power from an NFC field generated by NFC field generator 215, and may use the power to power controller 225 and/or secure element 240 when NFC device 205 is to perform a transaction in an unpowered mode. Additionally, or alternatively, power from an NFC field generated by NFC field generator 215 may be used to power NFC antenna 245 (e.g., regardless of whether NFC device 205 is operating in a powered mode or unpowered mode, in some cases).

Power source 220 includes one or more devices, internal to NFC device 205, capable of supplying power. For example, power source 220 may include a battery (e.g., a rechargeable battery, a non-rechargeable battery, and/or the like), a power supply, a capacitor, and/or the like. In some implementations, NFC device 205 (e.g., controller 225 and/or secure element 240) may obtain power from power source 220 when NFC device 205 is to perform a transaction in a powered mode. In some aspects, NFC device 205 may include a single power source 220, which may supply power for performing a transaction and/or may supply power to one or more other components of NFC device 205 (e.g., a processor, a storage component, an input component, an output component, a communication interface, and/or the like). In some aspects, NFC device 205 may include multiple power sources 220. In some aspects, a single power source 220 may be dedicated to supplying power solely for performing a transaction, while other powers sources 220 supply power to other components of NFC device 205.

Controller 225 includes one or more devices capable of receiving, generating, storing, processing, and/or providing information and/or instructions that assist with performing a transaction. For example, controller 225 may include a processor, such as processor 320 described below in connection with FIG. 3. Additionally, or alternatively, controller 225 may include memory, such as memory 330 described below in connection with FIG. 3. In some implementations, the memory may store information associated with performing a transaction (e.g., one or more applications, a configuration for one or more applications, and/or the like), and the controller may provide such information to secure element 240 to perform the transaction (e.g., in a powered mode). In some implementations, controller 225 may receive power from power source 220.

Management component 230 includes one or more devices capable of controlling whether transaction IC 235 (e.g., secure element 240 and/or NFC antenna 245) receives power from power source 220 and/or receives information from controller 225. For example, management component 230 may include a switch, a gate, a controller, a processing component, and/or the like. In some implementations, management component 230 may include a bidirectional logic level shifter to control signals between controller 225 and secure element 240 (e.g., to couple or decouple controller 225 and secure element 240, to prevent signals from being passed between controller 225 and secure element 240, and/or the like). Additionally, or alternatively, management component 230 may include a diode (e.g., an ideal diode) and/or a switch (e.g., a load switch) to control signals between power source 220 and secure element 240 (e.g., to couple or decouple power source 220 and secure element 240, to prevent signals from being passed between power source 220 and secure element 240, and/or the like). In some implementations, management component 230 may couple transaction IC 235 to power source 220 and/or controller 225 when NFC device 205 is to perform a transaction in a powered mode, and/or may decouple transaction IC 235 from power source 220 and/or controller 225 when NFC device 205 is to perform a transaction in an unpowered mode. In some implementations, management component 230 may include a booster to improve transaction speed and/or range of NFC antenna 245 when NFC device 205 performs a transaction in a powered mode.

Transaction IC 235 includes an integrated circuit that connects secure element 240 and NFC antenna 245. For example, transaction IC 235 may include secure element 240, NFC antenna 245, and a connection between secure element 240 and NFC antenna 245.

Secure element 240 includes one or more devices capable of securely hosting an operating system and/or an application, and/or storing confidential information (e.g., a credential, cryptographic information, and/or the like). For example, secure element 240 may include a universal integrated circuit card (UICC), a secure digital (SD) card (e.g., a microSD card and/or the like), an embedded secure element, and/or the like. In some implementations, secure element 240 may include a tamper resistant hardware platform. In some implementations, secure element 240 may host a personalized card application and a cryptographic key required to perform a financial transaction (e.g., with transaction terminal 210). In some implementations, secure element 240 may store a credential, such as a username, a password, biometric information, a token, a certificate for signing documents, and/or the like.

NFC antenna 245 includes an antenna capable of transmitting and/or receiving information using an NFC protocol. For example, NFC antenna 245 may include a loop antenna (e.g., an NFC loop antenna), an inductor (e.g., an NFC inductor), and/or the like. In some implementations, NFC antenna 245 may be integrated into secure element 240 (e.g., may be part of the same integrated circuit, such as transaction IC 235).

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
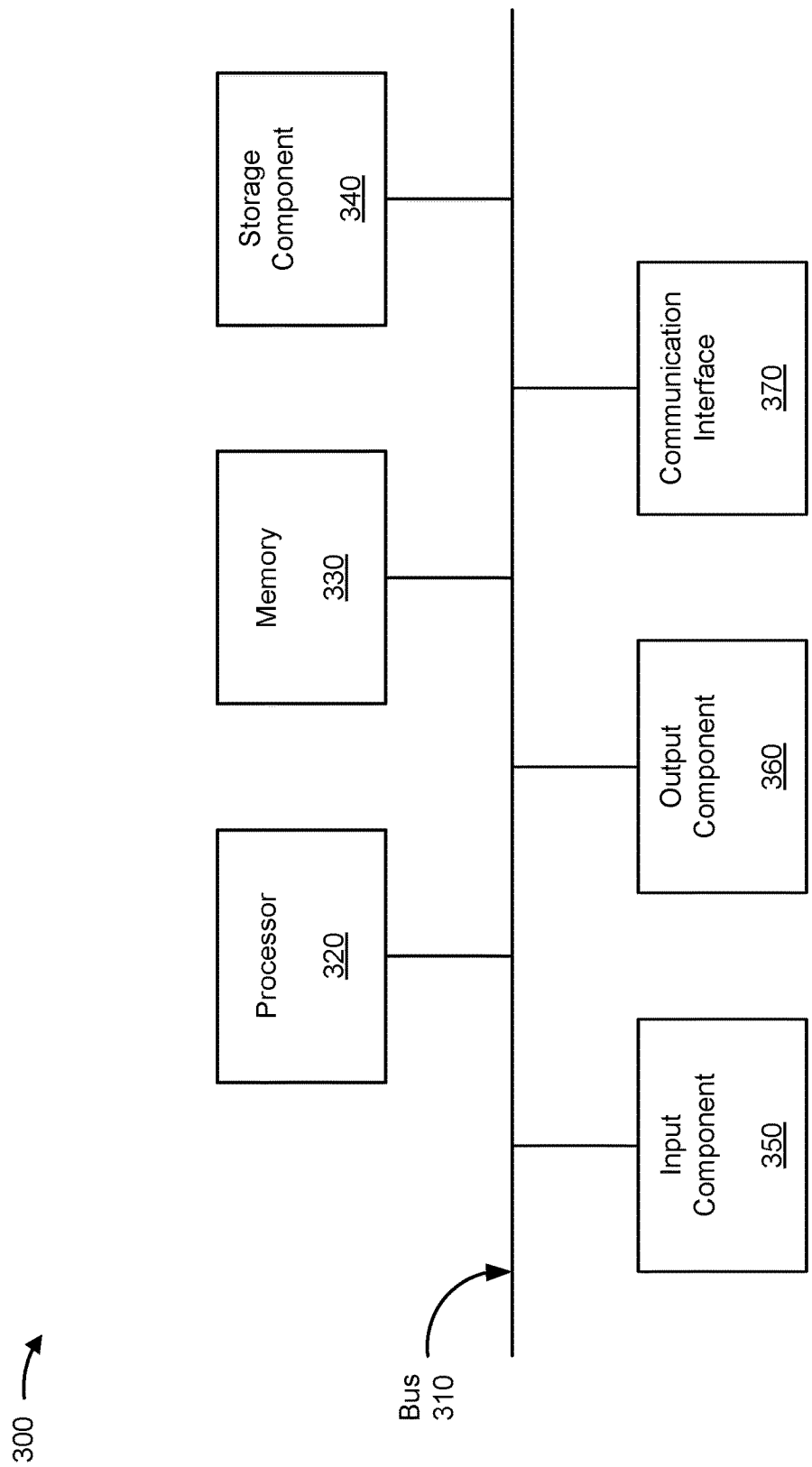
FIG. 3 is a diagram of example components of one or more devices of FIG. 2.

FIG. 3 is a diagram of example components of a device 300. Device 300 may correspond to NFC device 205, transaction terminal 210, NFC field generator 215, power source 220, controller 225, management component 230, transaction IC 235, secure element 240, and/or NFC antenna 245. In some implementations, NFC device 205, transaction terminal 210, NFC field generator 215, power source 220, controller 225, management component 230, transaction IC 235, secure element 240, and/or NFC antenna 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., an ambient light sensor, a photodiode, a photodetector, a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
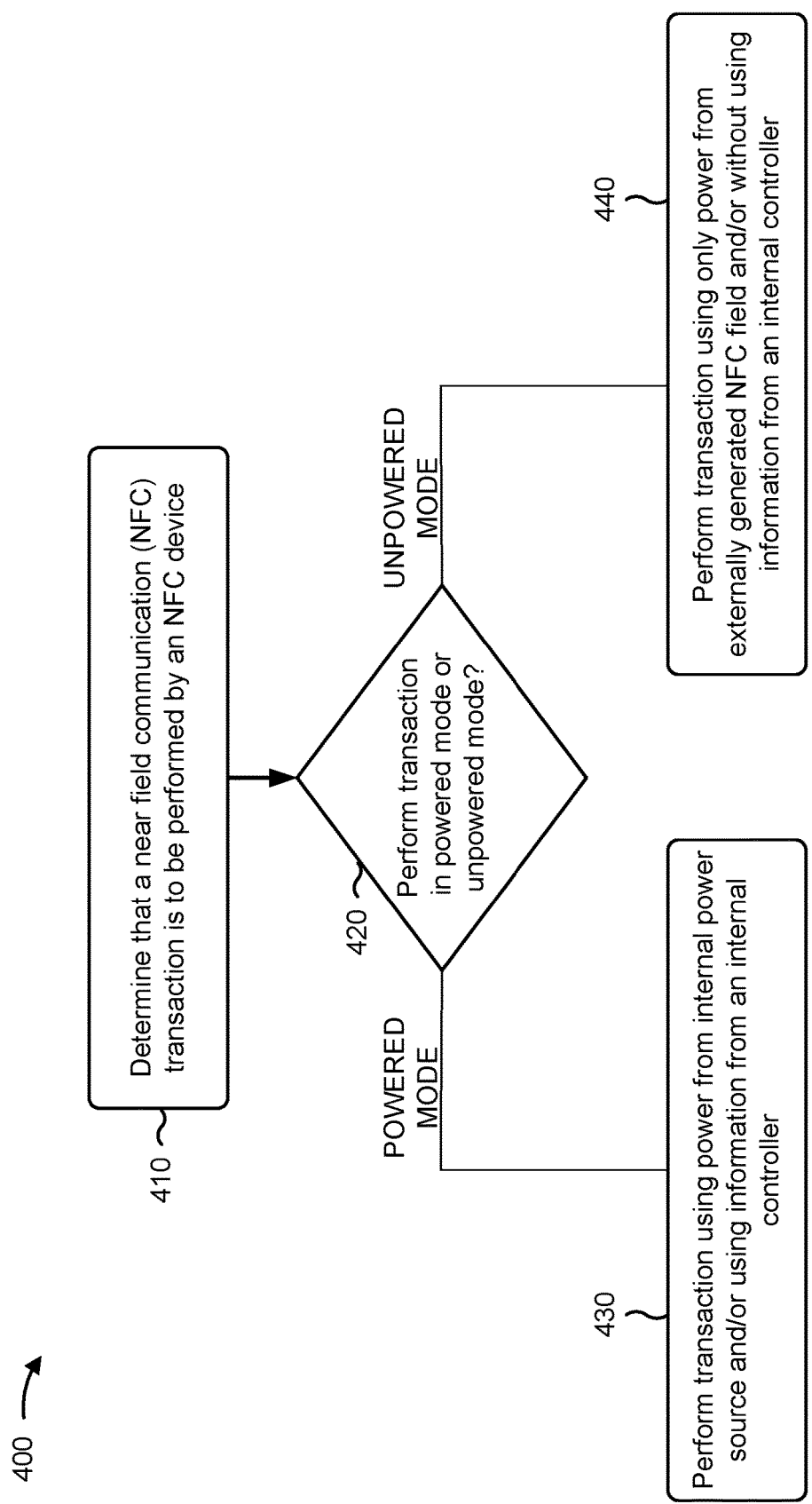
FIG. 4 is a flow chart of an example process for performing an NFC transaction in a powered or unpowered mode.

FIG. 4 is a flow chart of an example process 400 for performing an NFC transaction in a powered or unpowered mode. In some implementations, one or more process blocks of FIG. 4 may be performed by NFC device 205.

As shown in FIG. 4, process 400 may include determining that a near field communication (NFC) transaction is to be performed by an NFC device (block 410) and determining whether the transaction is to be performed in a powered mode or an unpowered mode (block 420). For example, NFC device 205 may determine that NFC device 205 is to perform an NFC transaction. The NFC transaction may include an exchange of information via NFC (e.g., an NFC data transmission and/or data reception), and may include a financial transaction, a contactless transaction, a wireless transaction, a transaction for identity verification, a transaction for accessing a secured area, a transit transaction, a ticketing transaction, a transaction to transmit a file, and/or the like. In some implementations, NFC device 205 may determine that NFC device 205 is to perform the NFC transaction based on a request received from transaction terminal 210 (e.g., a request to perform the transaction).

In some implementations, NFC device 205 may determine whether NFC device 205 is to perform the transaction in the powered mode or the unpowered mode based on a remaining power level of power source 220 (e.g., a power source internal to NFC device 205). For example, if the remaining power level of power source 220 is less than or equal to a threshold, then NFC device 205 may determine that NFC device 205 is to perform the transaction in the unpowered mode. Conversely, if the remaining power level of power source 220 is greater than or equal to a threshold, then NFC device 205 may determine that NFC device 205 is to perform the transaction in the powered mode. In some implementations, the threshold may correspond to an amount of power required to perform the transaction. Additionally, or alternatively, the threshold may be zero, which may correspond to power source 220 being completely drained.

Additionally, or alternatively, the threshold may correspond to an amount of power required to perform the transaction using one or more applications. For example, secure element 240 may require a first amount of power (e.g., a lesser amount) to perform the transaction using a basic transaction application, and may require a second amount of power (e.g., a greater amount) to perform the transaction using an application that increases security of the transaction as compared to the basic transaction application. If the remaining amount of power of power source 220 is greater than the first amount but less than the second amount, then NFC device 205 may perform the transaction by powering the basic transaction application using power from power source 220. Additionally, or alternatively, NFC device 205 may select one or more applications to be loaded onto secure element 240 and used to perform the transaction based on the remaining power level of the internal power source. For example, if the remaining amount of power of power source 220 is greater than the first amount but less than the second amount, then NFC device 205 may load the basic transaction application onto secure element 240 without loading the application to increase security onto secure element 240.

Additionally, or alternatively, NFC device 205 may determine whether NFC device 205 is to perform the transaction in the powered mode or the unpowered mode based on a preference (e.g., a preference of a transacting party, such as a user, a merchant, and/or the like). For example, a user of NFC device 205 may indicate that NFC device 205 should only operate in the powered mode to provide additional security for transactions, for example. As another example, a merchant associated with transaction terminal 210 may only accept transactions from NFC devices 205 operating in a powered mode (e.g., to increase security of the transaction). In this case, the preference may be communicated to NFC device 205 (e.g., via transaction terminal 205) and/or may be stored by NFC device 205, and may be used to determine whether to perform the transaction in a powered mode or an unpowered mode.

Additionally, or alternatively, NFC device 205 may determine whether NFC device 205 is to perform the transaction in the powered mode or the unpowered mode based on a type of the transaction (e.g., a financial transaction, an access transaction, a fare card transaction, a transit transaction, a ticketing transaction, an identity verification transaction, and/or the like). For example, some transaction types may be associated with additional processing (e.g., for security, transaction analytics, and/or the like). In this case, NFC device 205 may determine a type of the transaction, and may determine whether to perform the transaction in the powered mode or the unpowered mode based on a type of the transaction (e.g., based on information stored by NFC device 205). Additionally, or alternatively, different types of transactions may be associated with different preferences, as described above, and NFC device 205 may determine whether to perform the transaction in the powered mode or the unpowered mode based on a type of the transaction and a preference associated with the type of transaction.

Additionally, or alternatively, if power source 220 is used to power other components of NFC device 205 other than controller 225, then power source 220 may determine an amount of power needed to power the other components (e.g., for a threshold amount of time), and may set a threshold for determining whether to perform the transaction in the powered mode or the unpowered mode based on the amount of power needed to power the other components (e.g., for the threshold amount of time). In this way, power may be reserved for other components of NFC device 205. In some implementations, NFC device 205 may shut off the other components to conserve power for a transaction when a remaining power level of power source 220 satisfies a threshold.

Additionally, or alternatively, NFC device 205 may determine an amount of time that it will take to harness sufficient power from NFC field generator(s) 215 to power the transaction, and may determine whether to perform the transaction in the powered mode or the unpowered mode based on the amount of time. For example, NFC device 205 may compare the amount of time to a threshold. In some implementations, if the amount of time is greater than or equal to a threshold, then NFC device 205 may perform the transaction in the powered mode. Conversely, if the amount of time is less than or equal to a threshold, then NFC device 205 may perform the transaction in the unpowered mode.

As further shown in FIG. 4, if the transaction is to be performed in the powered mode (block 420—POWERED MODE), then process 400 may include performing the transaction using power from an internal power source and/or using information from an internal controller (block 430). For example, if NFC device 205 performs the transaction in the powered mode, then NFC device 205 may use power from power source 220 (e.g., internal to NFC device 205) to perform the transaction. In this case, secure element 240, NFC antenna 245, and/or controller 225 may receive power from power source 220 to perform the transaction. In some implementations, NFC device 205 (e.g., management component 230) may couple an integrated circuit, that includes secure element 240 and NFC antenna 245, with power source 220 when the transaction is performed in the powered mode. In some implementations, NFC antenna 245 may receive power from power source 220 to increase a speed and/or a range of the transaction (e.g., using a booster component of NFC device 205).

Additionally, or alternatively, if NFC device 205 performs the transaction in the powered mode, then NFC device 205 may use information from controller 225 (e.g., internal to NFC device 205) to perform the transaction. Such information may include, for example, an application for performing the transaction, a configuration for the application, and/or the like. For example, if NFC device 205 performs the transaction in the powered mode, then NFC device 205 may load one or more applications, associated with performing the transaction, onto secure element 240 (e.g., for provisioning secure element 240 for the transaction, for requesting one or more credentials for authentication, and/or the like). In some implementations, NFC device 205 (e.g., management component 230) may couple an integrated circuit, that includes secure element 240 and NFC antenna 245, with controller 225 when the transaction is performed in the powered mode. For example, controller 225 may receive power from power source 220 to monitor transaction data from secure element 240 and/or provide a result of the monitoring to secure element 240 (e.g., to indicate whether to complete the transaction and/or the like), to communicate with secure element 240 during the transaction, and/or the like. In this way, the transaction may be performed more quickly and/or in an improved manner (e.g., with improved security and/or the like) when NFC device 205 has sufficient internal power from power source 220 to perform the transaction, may be performed in accordance with a preference, may be customized for a particular type of transaction, and/or the like.

As further shown in FIG. 4, if the transaction is to be performed in the unpowered mode (block 420—UNPOWERED MODE), then process 400 may include performing the transaction using only power from an externally generated NFC field and/or without using information from an internal controller (block 440). For example, if NFC device 205 performs the transaction in the unpowered mode, then NFC device 205 may perform the transaction without using power from internal power source 220. In this case, NFC device 205 may use power only from an NFC field generated by an NFC field generator 215 to perform the transaction. In this case, secure element 240 and/or NFC antenna 245 may receive power from the NFC field to perform the transaction. In some implementations, NFC device 205 (e.g., management component 230) may decouple an integrated circuit, that includes secure element 240 and NFC antenna 245, from power source 220 when the transaction is performed in the unpowered mode.

In some implementations, NFC device 205 may perform the transaction using different applications based on whether NFC device 205 performs the transaction in the powered mode or the unpowered mode. For example, secure element 240 may require a first amount of power (e.g., a lesser amount) to perform the transaction using a basic transaction application, and may require a second amount of power (e.g., a greater amount) to perform the transaction using an application that increases security of the transaction as compared to the basic transaction application. If the remaining amount of power of power source 220 is greater than the first amount but less than the second amount, then NFC device 205 may perform the transaction by powering the basic transaction application using power from power source 220. Additionally, or alternatively, NFC device 205 may select one or more applications to be loaded onto secure element 240 and used to perform the transaction based on the remaining power level of the internal power source. For example, if the remaining amount of power of power source 220 is greater than the first amount but less than the second amount, then NFC device 205 may load the basic transaction application onto secure element 240 without loading the application to increase security onto secure element 240.

In some implementations, NFC device 205 may perform the transaction using a same application regardless of whether NFC device 205 performs the transaction in the powered mode or the unpowered mode. In this case, the transaction may take longer to perform in the unpowered mode, and may be performed more quickly in the powered mode.

Additionally, or alternatively, if NFC device 205 performs the transaction in the unpowered mode, then NFC device 205 may not use information from controller 225 (e.g., internal to NFC device 205) to perform the transaction. For example, if NFC device 205 performs the transaction in the unpowered mode, then NFC device 205 may prevent one or more applications, associated with performing the transaction, from being loaded onto secure element 240. In some implementations, NFC device 205 (e.g., management component 230) may decouple an integrated circuit, that includes secure element 240 and NFC antenna 245, from controller 225 when the transaction is performed in the unpowered mode. In this way, the transaction may be performed despite NFC device 205 not having sufficient internal power from power source 220 to perform the transaction, may be performed in accordance with a preference, may be customized for a particular type of transaction, and/or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein permit an NFC device to switch between using power from an internal power source and power from an NFC field to assist with performing a transaction. In this way, one or more applications can be quickly loaded, unloaded, and/or configured when the internal power source has sufficient power, and the NFC device can fall back to using power from an NFC field to load, unload, and/or configure an application when the internal power source does not have sufficient power.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A near field communication (NFC) device, comprising:
an internal power source;
a secure element;
an NFC antenna integrated with the secure element; and
one or more components, at least partially implemented in hardware, configured to:
determine a type of transaction associated with performing a contactless transaction; and
selectively load, based on a remaining power level of the internal power source and the type of transaction, one or more applications, associated with performing the contactless transaction, onto the secure element,
wherein selectively loading the one or more applications is based on determining an amount of time associated with powering the transaction based on the type of transaction.

2. The NFC device of claim 1, wherein the remaining power level does not meet a threshold, and
wherein the one or more components, when selectively loading the one or more applications, are configured to:
prevent loading of the one or more applications.

3. The NFC device of claim 1, wherein the secure element requires:
a first amount of power to perform the transaction using a basic application, of the one or more applications, and
a second amount of power to perform the transaction using a security application, of the one or more applications,
wherein the security application increases security of the transaction as compared to the basic application.

4. The NFC device of claim 3, wherein the remaining power level is greater than the first amount of power but less than the second amount of power, and
wherein the one or more components, when selectively loading the one or more applications, are configured to:
load the basic application onto the secure element without loading the security application onto the secure element.

5. The NFC device of claim 3, wherein the remaining power level is greater than the first amount of power and the second amount of power, and
wherein the one or more components, when selectively loading the one or more applications, are configured to:
load the basic application with the secure application onto the secure element.

6. The NFC device of claim 1, wherein the remaining power level does not meet a threshold, and
wherein the one or more components are further configured to:
use power from an externally-generated NFC field to load the one or more applications onto the secure element.

7. The NFC device of claim 1, wherein the one or more components are further configured to:
unload an application not associated with the contactless transaction from the secure element.

8. A method, comprising:
determining, by a near field communication (NFC) device, a type of transaction associated with performing a contactless transaction; and
selectively loading, by the NFC device and based on a remaining power level of an internal power source of the NFC device and the type of transaction, one or more applications, associated with performing the contactless transaction, onto a secure element of the NFC device,
wherein selectively loading the one or more applications is based on determining an amount of time associated with powering the transaction based on the type of transaction.

9. The method of claim 8, wherein the remaining power level does not meet a threshold, and
wherein selectively loading the one or more applications comprises:
preventing loading of the one or more applications.

10. The method of claim 8, wherein the secure element requires:
a first amount of power to perform the transaction using a basic application, of the one or more applications, and
a second amount of power to perform the transaction using a security application, of the one or more applications,
wherein the security application increases security of the transaction as compared to the basic application.

11. The method of claim 10, wherein the remaining power level is greater than the first amount of power but less than the second amount of power, and
wherein selectively loading the one or more applications comprises:
loading the basic application onto the secure element without loading the security application onto the secure element.

12. The method of claim 10, wherein the remaining power level is greater than the first amount of power and the second amount of power, and
wherein selectively loading the one or more applications comprises:
loading the basic application with the secure application onto the secure element.

13. The method of claim 8, wherein the remaining power level does not meet a threshold, and
further comprising:
using power from an externally-generated NFC field to load the one or more applications onto the secure element.

14. The method of claim 8, further comprising:
unloading an application not associated with the contactless transaction from the secure element.

15. An apparatus, comprising:
an internal power source; and
an integrated circuit that includes an antenna and a secure element, the secure element capable of selectively loading, by a near field communication (NFC) device and based on a remaining power level of the internal power source of the NFC device and based on determination of a type of transaction associated with performing a contactless transaction, one or more applications, associated with performing the contactless transaction, onto the secure element,
  wherein selectively loading the one or more applications is based on determining an amount of time associated with powering the transaction based on the type of transaction.

16. The apparatus of claim 15, wherein the remaining power level does not meet a threshold, and
  wherein the apparatus, when selectively loading the one or more applications, is configured to:
    prevent loading of the one or more applications.

17. The apparatus of claim 15, wherein the secure element requires:
    a first amount of power to perform the transaction using a basic application, of the one or more applications, and
    a second amount of power to perform the transaction using a security application, of the one or more applications,
  wherein the security application increases security of the transaction as compared to the basic application.

18. The apparatus of claim 17, wherein the remaining power level is greater than the first amount of power but less than the second amount of power, and
  wherein the apparatus, when selectively loading the one or more applications, is configured to:
    load the basic application onto the secure element without loading the security application onto the secure element.

19. The apparatus of claim 17, wherein the remaining power level is greater than the first amount of power and the second amount of power, and
  wherein the apparatus, when selectively loading the one or more applications, is configured to:
    load the basic application with the secure application onto the secure element.

20. The apparatus of claim 15, wherein the remaining power level does not meet a threshold, and
  wherein the apparatus is further configured to:
    use power from an externally-generated NFC field to load the one or more applications onto the secure element.

* * * * *